United States Patent
Eom et al.

(10) Patent No.: US 9,898,238 B2
(45) Date of Patent: Feb. 20, 2018

(54) PRINTING CONTROL TERMINAL DEVICE CONNECTABLE TO AN IMAGE FORMING APPARATUS HAVING A RESOURCE SAVING MODE AND METHOD FOR PRINTING CONTROL THEREOF

(75) Inventors: Yong-in Eom, Hwaseong-si (KR); Young-soo Han, Yongin-si (KR); Mi-kyung Choi, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 1004 days.

(21) Appl. No.: 13/286,764

(22) Filed: Nov. 1, 2011

(65) Prior Publication Data

US 2012/0212758 A1    Aug. 23, 2012

(30) Foreign Application Priority Data

Feb. 18, 2011 (KR) ........................ 10-2011-0014791

(51) Int. Cl.
G06K 15/02 (2006.01)
G06F 3/12 (2006.01)

(52) U.S. Cl.
CPC .......... *G06F 3/1285* (2013.01); *G06F 3/1204* (2013.01); *G06F 3/1219* (2013.01); *G06F 3/1253* (2013.01); *G06F 3/1292* (2013.01)

(58) Field of Classification Search
CPC ............................. G06F 3/1218; G06F 3/1219
USPC ................... 358/1.13–1.15; 399/81, 82, 389
See application file for complete search history.

(56) References Cited

U.S. PATENT DOCUMENTS

| | | | |
|---|---|---|---|
| 6,490,049 B1 * | 12/2002 | Cunnagin | B41J 2/5056 358/1.13 |
| 8,049,909 B2 | 11/2011 | Lee | |
| 8,169,629 B2 * | 5/2012 | Kuroda | G06F 3/1203 358/1.13 |
| 8,711,376 B2 | 4/2014 | Kouira | |
| 2004/0039811 A1 * | 2/2004 | Nakamura | G06F 3/1204 709/223 |
| 2004/0090643 A1 * | 5/2004 | Ochi | H04N 1/00204 358/1.13 |

(Continued)

FOREIGN PATENT DOCUMENTS

| CN | 102238308 | 11/2001 |
|---|---|---|
| CN | 1770091 | 5/2006 |

(Continued)

OTHER PUBLICATIONS

Extended European Search Report issued in Application No. 11190123.7 dated May 8, 2013.

(Continued)

*Primary Examiner* — Edwin S Leland, III
(74) *Attorney, Agent, or Firm* — Staas & Halsey LLP (57) ABSTRACT

A printing control terminal device including an input unit to receive a printing order to request a printing operation for a printing work, a communication interface unit to receive information regarding a resource saving mode from an image forming apparatus, a display unit to display information regarding the received resource saving mode, a printer driver unit to generate printing data for the printing work, and a controller to control the communication interface unit to transmit the generated printing data to the image forming apparatus.

17 Claims, 7 Drawing Sheets

(56) References Cited

U.S. PATENT DOCUMENTS

| | | | |
|---|---|---|---|
| 2004/0179230 A1* | 9/2004 | Kitada | H04N 1/00954 358/1.15 |
| 2005/0138573 A1 | 6/2005 | Mathieson | |
| 2006/0082825 A1* | 4/2006 | Lee | G06F 3/1211 358/1.15 |
| 2006/0221863 A1* | 10/2006 | Ishimoto | G06F 3/1206 370/254 |
| 2008/0008508 A1* | 1/2008 | Mizobuchi | G03G 21/02 399/389 |
| 2008/0037058 A1* | 2/2008 | Ban | 358/1.15 |
| 2008/0043280 A1* | 2/2008 | Lee | H04N 1/0044 358/1.15 |
| 2008/0120512 A1* | 5/2008 | Wang | G06F 1/3203 713/300 |
| 2008/0180716 A1* | 7/2008 | Miyata | G06F 3/1204 358/1.13 |
| 2009/0002732 A1* | 1/2009 | Shirata | H04N 1/34 358/1.9 |
| 2010/0226662 A1* | 9/2010 | Takatani | 399/8 |
| 2010/0231960 A1* | 9/2010 | Kurata | G06F 3/1219 358/1.15 |
| 2010/0271661 A1* | 10/2010 | Ogino | G06F 3/1205 358/1.15 |
| 2011/0051164 A1* | 3/2011 | Toizumi | G06F 3/1219 358/1.13 |
| 2011/0116108 A1* | 5/2011 | Ha | G06F 3/1219 358/1.2 |
| 2011/0231026 A1* | 9/2011 | Yaoyama | G03G 15/5004 700/291 |
| 2011/0261382 A1* | 10/2011 | Koura | G06F 3/1208 358/1.13 |
| 2011/0279858 A1* | 11/2011 | Kano | G06F 3/1218 358/1.15 |
| 2012/0026519 A1* | 2/2012 | Yoshida | H04N 1/00442 358/1.11 |
| 2012/0212758 A1* | 8/2012 | Eom | G06F 3/1204 358/1.13 |
| 2012/0320410 A1* | 12/2012 | Kakegawa | G06F 3/1219 358/1.15 |
| 2013/0063756 A1* | 3/2013 | Gray | G06F 1/3284 358/1.14 |

FOREIGN PATENT DOCUMENTS

| | | | |
|---|---|---|---|
| CN | 101127811 A | 2/2008 | |
| EP | 1215877 | 6/2002 | |
| EP | 1215877 A2 * | 6/2002 | G06F 3/1219 |
| EP | 2381356 | 10/2011 | |
| JP | 2010-257219 | 11/2010 | |
| JP | 2010257219 A * | 11/2010 | G06F 3/1205 |

OTHER PUBLICATIONS

Chinese Office Action issued Oct. 10, 2015 in corresponding Chinese Patent Application 201110461352.3.
Korean Office action dated Sep. 9, 2016 in Korean Patent Application No. 10-2011-0014791.
Chinese Office Action dated May 30, 2016 in Chinese Patent Application No. 201110461352.3.
Chinese Office Action dated Dec. 1, 2016 in corresponding Chinese Patent Application No. 201110461352.3.
Korean Office Action dated Aug. 10, 2017 from Korean Patent Application No. 10-2017-0064267, 8 pages.
Chinese Office Action dated May 17, 2017 in corresponding Chinese Patent Application No. 201110461352.3.

* cited by examiner

PRINTING CONTROL TERMINAL DEVICE CONNECTABLE TO AN IMAGE FORMING APPARATUS HAVING A RESOURCE SAVING MODE AND METHOD FOR PRINTING CONTROL THEREOF

CROSS-REFERENCE TO RELATED APPLICATIONS

This application claims the benefit of priority under 35 U.S.C. § 119 to Korean Patent Application No. 10-2011-0014791, filed on Feb. 18, 2011, in the Korean Intellectual Property Office, the disclosure of which is incorporated herein by reference in its entirety.

BACKGROUND OF THE INVENTION

1. Field of the Invention

The present general inventive concept generally relates to a printing control terminal device and a printing control method, and more particularly, to a printing control terminal device and a printing control method through which the user can easily identify whether an image forming apparatus is operating in a resource saving mode.

2. Description of the Related Art

As the use of computers has increased, the use of computer peripherals has also increased. Typical examples of computer peripherals are image forming apparatuses such as a printers, scanners, copiers, and Multi Function Peripherals (MFP) which have two or more functions of a printer, a scanner, and a copier, In printing, consumables of the printer are used when a printing operation is performed. An increase in the use of consumables increases costs and can have a negative effect on business. Therefore, it is beneficial to optimize the consumable use of a printer. Additionally, as the realization and regulation of eco-friendly become more widespread, more eco-friendly elements to reduce the usage of consumables are introduced to printers.

Recent image forming apparatuses have a resource saving mode (or an ECO mode) which can save the amount of paper and/or toner used to print. Specifically, the resource saving mode applies printing options that save the amount of paper and/or toner used in a printing operation of the image forming apparatus. In recent printing control terminal devices, when a user requests a printing operation from an image forming apparatus that is operating in the resource saving mode, the printing control terminal device receives information from the image forming apparatus regarding the resource saving mode, generates printing data according to the printing options applied during the resource saving mode, and transmits the generated printing data to the image forming apparatus so as to carry out the printing operation.

However, such a printing method is inconvenient for the user in that he/she cannot easily identify whether the image forming apparatus performing the printing operation is operating in the resource saving mode. Specifically, in order to identify whether or not the image forming apparatus is operating in the resource saving mode, the user must manually navigate to a properties menu or web page which indicates the set properties of the image forming apparatus or must physically move to the image forming apparatus and navigate through menus on a user interface of the image forming apparatus to make a determination.

Further, if the image forming apparatus is used by multiple users and one user sets the image forming apparatus to operate in a resource saving mode, other users are not notified that the image forming apparatus is now operating in the resource saving mode, and thus they can unexpectedly obtain printouts to which the resource saving mode options applied even if they did not intend or desire that such options be applied.

SUMMARY

The present general inventive concept provides a printing control terminal device and a printing control method through which a user can easily identify whether an image forming apparatus is operating in a resource saving mode.

Additional aspects and advantages of the present general inventive concept will be set forth in part in the description which follows and, in part, will be obvious from the description, or may be learned by practice of the general inventive concept.

The foregoing and other features and utilities of the present general inventive concept may be realized by a printing control terminal device including an input unit to receive a printing order to request a printing operation for a printing work, a communication interface unit to receive information regarding a resource saving mode from an image forming apparatus, a display unit to display the received information regarding the resource saving mode, a printer driver unit to generate printing data for the printing work, and a controller to control the communication interface unit to transmit the generated printing data to the image forming apparatus.

The information regarding the resource saving mode may include information of whether or not the image forming apparatus is operating in the resource saving mode and information of printing options applied during a printing operation in the resource saving mode.

The printing options applied during the printing operation in the resource saving mode may include at least one of a double-sided output option, a multipage output option, a downsized printing option, a black and white output option, a toner saving/concentration adjusting option, a printing quality/resolution option, a batch output option, a blank page deleting option, and a background deleting option.

The printing control terminal device may further include a determining unit to determine whether or not the image forming apparatus is operating in the resource saving mode based on the received information regarding the resource saving mode, wherein if the determination unit determines that the image forming apparatus is operating in the resource saving mode, the printer driver unit generates printing data according to the printing options applied when the image forming apparatus is operating in the resource saving mode.

If the determination unit determines that image forming apparatus is operating in the resource saving mode, the display unit may display that the image forming apparatus is operating in the resource saving mode.

The display unit may display, in the form of a pop-up window, a user interface window including a first area to display whether the image forming apparatus is operating in the resource saving mode, and a second area to display information of printing options applied during a printing operation in the resource saving mode.

The user interface window may further include a third area to display property values corresponding to the printing options applied during the printing operation in the resource saving mode and to allow a user to set the property values.

The printer driver unit may generate printing data according to the printing options applied when the image forming apparatus is operating in the resource saving mode and the property values selected by the user through the third area.

The user interface window may further include a fourth area to receive a confirmation of whether or not to display the user interface window during a printing operation for a subsequent printing work.

The printing control terminal device may further include a storage unit to store information of the confirmation of whether or not to display the user interface window that is received in the fourth area, wherein the display unit displays the received information regarding the resource saving mode according to the stored information of the confirmation of whether or not to display the user interface window.

The foregoing and other features and utilities of the present general inventive concept may also be realized by a printing control method of a printing control terminal device including receiving an input of a printing order to request a printing operation for a printing work, receiving information regarding a resource saving mode from the image forming apparatus, displaying information regarding the received resource saving mode, generating printing data for the printing work, and transmitting the generated printing data to the image forming apparatus.

The information regarding the resource saving mode may include information of whether or not the image forming apparatus is operating in the resource saving mode and information of printing options applied when the image forming apparatus is operating in the resource saving mode.

The printing options applied during a printing operation in the resource saving mode may include at least one a double-sided output option, a multipage output option, a downsized printing option, a black and white output option, a toner saving/concentration adjusting option, a printing quality/resolution option, a batch output option, a blank page deleting option, and a background deleting option.

The printing control method may further include determining whether or not the image forming apparatus is operating in the resource saving mode based on the received information of the resource saving mode, wherein if it is determined that the image forming apparatus is operating in the resource saving mode, the generating the print data includes generating the printing data according to the printing options applied when the image forming apparatus is operating in the resource saving mode.

If it is determined that the image forming apparatus is operating in the resource saving mode, the displaying may include displaying that the image forming apparatus is operating in the resource saving mode.

The displaying may include displaying, in the form of a pop-up window, a user interface window including a first area to display whether the image forming apparatus is operating in the resource saving mode, and a second area to display information of the printing options applied during a printing operation in the resource saving mode.

The user interface window may further include a third area to display property values corresponding to the printing options applied during the printing operation in the resource saving mode and to allow a user to set the property values.

The generating printing data may include generating printing data according to the printing options applied when the image forming apparatus is operating in the resource saving mode and the property values set by the user through the third area.

The user interface window may further include a fourth area to receive a confirmation of whether or not to display the user interface window during a printing operation for a subsequent printing work.

The displaying may include displaying the received information regarding the resource saving mode according to pre-stored information of whether or not to display the user interface window which is inputted by the user through the fourth area during a printing operation of a previous printing work.

The foregoing and other features and utilities of the present general inventive concept may also be realized by a printing control terminal device connectable to an image forming apparatus having a resource saving mode, the printing control terminal including an input unit to receive a print command to request a printing operation, a communication interface unit to obtain information regarding the resource saving mode of the image forming apparatus from the image forming apparatus in response to the print command, a display unit to display a user interface window having a first area including the received information regarding the resource saving mode and a second area to receive a selection command to select between a normal mode and the resource saving mode of the image forming apparatus, and a printer driver unit to generate printing data corresponding to the printing command according to the selection command.

The first area may further include a notification area to display information indicating whether or not the image forming apparatus is operating in the resource saving mode.

The first area may further include a printing option area to display information regarding printing options which will be applied to the printing data when the image forming apparatus is operating in the resource saving mode.

The printing option area may further include a property value area to display property values corresponding to printing options which will be applied to the printing data when the image forming apparatus is operating in the resource saving mode and to avow a user to set the property values, wherein the printer driver generates the printing data according to the selection command and the property values set through the property value area of the user interface window.

The user interface window may further include a notification setting area to allow a user to set a notification option of whether or not to display the user interface window for a subsequent printing operation.

When the normal mode is selected through the second area, the print driver may apply print options corresponding to the normal mode when generating the print data and when the resource saving mode is selected through the second area, the print driver may apply print options corresponding to the resource saving mode when generating the print data.

The second area may include a yes area to select a current mode of the image forming apparatus, and a no area to select a non-current mode of the image forming apparatus, wherein the first area indicates the current mode of the image forming apparatus, the current mode being one of the normal mode and the resource saving mode and the non-current mode being the other of the normal mode and the resource saving mode.

The foregoing and other features and utilities of the present general inventive concept may also be realized by a printing control method of a printing control terminal device connectable to an image forming apparatus having a resource saving mode, the method including receiving a print command to request a printing operation, obtaining information regarding the resource saving mode of the image forming apparatus from the image forming apparatus in response to the print command, displaying a user interface window having a first area including the received information regarding the resource saving mode and a second area to receive a selection command to select between a normal mode and the resource saving mode of the image forming apparatus, and generating printing data corresponding to the printing command according to the selection command.

The foregoing and other features and utilities of the present general inventive concept may also be realized by a non-transitory computer-readable recording medium having embodied thereon a computer program to execute a method of a printing control terminal device connectable to an image forming apparatus having a resource saving mode, wherein the method include receiving a print command to request a printing operation, obtaining information regarding the resource saving mode of the image forming apparatus from the image forming apparatus in response to the print command, displaying a user interface window having a first area including the received information regarding the resource saving mode and a second area to receive a selection command to select between a normal mode and the resource saving mode of the image forming apparatus, and generating printing data corresponding to the printing command according to the selection command.

The foregoing and other features and utilities of the present general inventive concept may also be realized by a printing control terminal device usable with an image forming apparatus, the printing control terminal device including an input unit to receive a print command to correspond to a printing operation, a display unit to display a user interface including a plurality of sub-menu tabs to respectively display a plurality of corresponding selections when one of the sub-menu tabs is selected, and one of the sub-menu tabs is a resource saving mode tab to a plurality of selections corresponding to the resource saving mode when the resource saving mode tab is selected, and a printer driver unit to generate printing data according to the plurality of selections corresponding to the resource saving mode tab.

The foregoing and other features and utilities of the present general inventive concept may also be realized by a mobile device wirelessly connectable to an image forming apparatus having a resource saving mode, the mobile device including an input unit to receive a print command to request a printing operation, a communication interface unit to communicate with the image forming apparatus via a wireless connection to obtain information regarding the resource saving mode of the image forming apparatus from the image forming apparatus in response to the print command, a display unit to display a user interface window having a first area including the received information regarding the resource saving mode and a second area to receive a selection command to select between a normal mode and the resource saving mode of the image forming apparatus, and a printer driver unit to generate printing data corresponding to the printing command according to the selection command.

The input unit and the display unit may include a touch screen.

The communication interface may transmit the generated printing data to the image forming apparatus via the wireless connection.

The mobile device may be at least one of a mobile phone, a personal digital assistant (PDA), a personal media player (PMP), and a tablet computer.

The foregoing and other features and utilities of the present general inventive concept may also be realized by a mobile device wirelessly connectable to an image forming apparatus having a resource saving mode, the mobile device including an input unit to receive a printing order to request a printing operation for a printing work, a communication interface unit to communicate with the image forming apparatus via a wireless connection to receive information regarding a resource saving mode from the image forming apparatus, a display unit to display the received information regarding the resource saving mode, a printer driver unit to generate printing data for the printing work, and a controller to control the communication interface unit to transmit the generated printing data to the image forming apparatus.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the general inventive concept. Thus, it is apparent that the present general inventive concept can be carried out without those specifically defined matters. Also, well-known functions or constructions are not described in detail since they would obscure the present general inventive concept with unnecessary detail.

Figure 1:
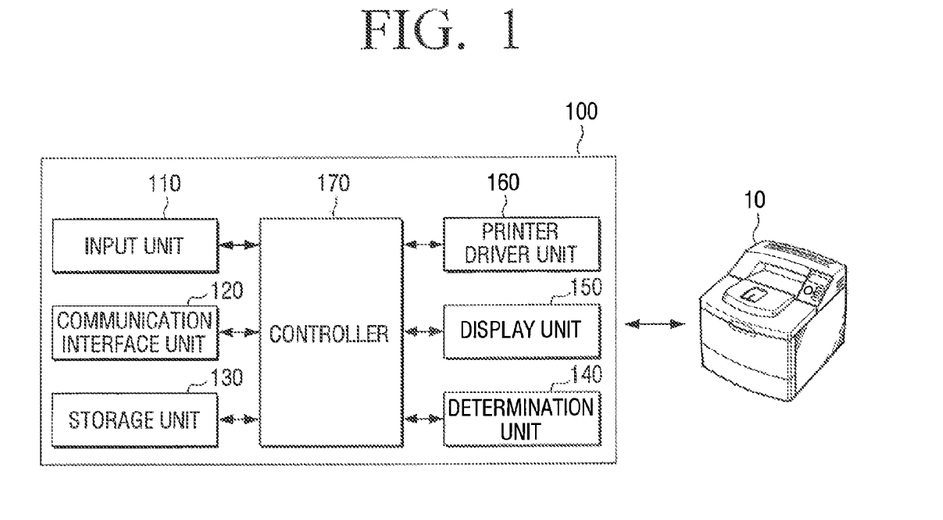
FIG. 1 is a block-diagram depicting a configuration of a printing control terminal device 100 according to one exemplary embodiment of the present general inventive concept.

FIG. 1 is a block-diagram depicting a configuration of a printing control terminal device 100 according to an exemplary embodiment of the present general inventive concept.

With reference to FIG. 1, the printing control terminal device 100 includes an input unit 110, a communication interface unit 120, a storage unit 130, a determination unit 140, a display unit 150, a printer driver unit 160, and a controller 170.

The printing control terminal device 100 is connected to an image forming apparatus 10 which supports a resource saving mode and prints out printing data. The printing control terminal device 100 may be a personal computer but is not limited thereto. The printing control terminal device 100 may also be, for example, a laptop, a PDA (Person& Digital Assistant), a PMP (Personal Media Player), a mobile phone, a tablet computer, or other mobile devices, etc. The printing control terminal device 100 may be connected to the image forming apparatus 10 directly or remotely, such as through a network. The printing control terminal device may be connected to the image forming apparatus 10 through a wired or a wireless connection, or a combination of the two.

The input unit 110 includes an interface by which the user can set or select various functions supported in the printing control terminal device 100, and may be embodied, for example, by a keyboard, a mouse, or an apparatus that performs the input and output simultaneously such as a touch pad, a touch screen, or the like.

The input unit 110 receives an input of a printing order to request a printing operation for a printing work. Specifically, the user can use the input unit 110 to select a printing work and a printing operation to cause the printing work to be printed, and to select a printing option to be applied to the selected printing work. The printing work may be, for example, a file or a portion of a file which is to be printed.

The communication interface unit 120 communicates with the image forming apparatus 10, and may communicate With other external apparatuses. That is, the communication interface unit 120 may transmit information to and/or receive information from the image forming apparatus 10. The communication interface unit 120 may communicate with the image forming apparatus 10 through, for example, a Local Area Network (LAN), an internet website, a Universal Serial Bus (USB) port, a wireless connection, or other communication mediums.

The communication interface unit 120 receives information from the image forming apparatus 10 regarding the resource saving mode. The information regarding the resource saving mode may include information of whether or not the image forming apparatus 10 is operating in a resource saving mode, information of printing options applied when the image forming apparatus 10 is operating in the resource saving mode, and property values (for example, the toner saving option, the resolution option etc.) applicable to the respective printing option. In addition, the printing options applied during the resource saving mode may include a double-sided output option, a multipage output option, a downsized printing option, a black and white output option, a toner saving/concentration adjusting option, a printing quality/resolution option, a batch output option, a blank page deleting option, a background deleting option, or a combination of the aforementioned printing options. The printing options applied during the resource saving mode may be set as a default by the producer of the image forming apparatus 10 and may be modified by an administrator or other users. Such information regarding the resource saving mode can be received when the printing order to request a printing operation for the printing work is inputted by the user, or in the case that such information is periodically received and stored, the recently stored information may be used.

The communication interface unit 120 transmits printing data to the image forming apparatus 10. Specifically, the communication interface unit 120 transmits printing data generated by the printer driver unit 100 to the image forming apparatus 10.

The storage unit 130 can store various printing works. Additionally, the storage unit 130 can store information of the resource saving mode received through the communication interface unit 120. Further, the storage unit 130 can temporarily store the printing data generated from the printer driver unit 160. Furthermore, the storage unit 130 can store the user's selection option (or the notification message option) of whether or not to display the user interface window to display information of the resource saving mode (or notification message) during the printing operation of the printing work.

The storage unit 130 may be, for example, an internal storage medium, such as a hard drive, a random-access memory, etc., or an external storage medium such as a removable disk including a USB memory, a web server, etc., of the printing control terminal device 100.

The determination unit 140 determines whether the image forming apparatus 10 is operating in the resource saving mode based on the received information of the resource saving mode. Specifically, the determination unit 140 can determine whether the image forming apparatus 10 is operating in the resource saving mode based on the information of whether or not the image forming apparatus 10 is operating in the resource saving mode among the information regarding the resource saving mode received through the communication interface unit 120.

The display unit 150 can display various information provided in the printing control terminal device 100, the status of the printing work which is in progress in the image forming apparatus 10, and the result thereof. The user can identify through the display unit 150 the printing work stored in the printing control terminal device 100, and select through the input unit 110 the printing work to be printed out.

The display unit 150 displays received information of the resource saving mode. Specifically, the display unit 150 can display, such as in the form of a pop-up window, information received through the communication interface unit 120 regarding the resource saving mode. For example, the display unit 150 can display in the form of a pop-up window a user interface window which includes a first area to display whether the image forming apparatus 10 is operating in the resource saving mode, a second area to display information regarding any printing options applied while the image forming apparatus 10 is being operated in the resource saving mode, a third area to display property values regarding respective printing options which can be varied by the user, and a fourth area to receive the confirmation of whether or not to display the user interface window to display the information of the resource saving mode for printing operations of subsequent printing works. The display unit 150 can also display a confirmation area to allow a user to confirm whether to proceed in the resource saving mode or whether to switch to the normal mode. While the display unit 150 is described as displaying a user interface window having first to fourth areas and a confirmation area, it is not limited thereto. For example, the display unit 150 may display may display a user interface window having less or more areas. Various examples of the user interface window displayed in the display unit 150 will be described later with reference to FIGS. 2 to 4.

The display unit 150 can display received information of the resource saving mode only when the image forming apparatus 10 is operating in the resource saving mode according to the determination result of the determination unit 140.

Meanwhile, in case that the user selects not to display the user interface window to display information of the resource saving mode during a printing operation of a previous printing work or during when setting printing options for the current printing work, the display unit 150 may not display received information of the resource saving mode.

in addition, if the user performing the current printing work sets the image forming apparatus to operate in the resource saving mode during the process of setting the printing options with respect to the current printing work, the user may identify that the image forming apparatus 10 is operating in the resource saving mode. Therefore, according to an exemplary embodiment, the display unit 150 may not display the user interface window to display information of the resource saving mode during a printing operation of the current printing work when the user sets the image forming apparatus 10 to operate in the resource saving mode during the process of setting the printing options with respect to the current printing work. The input unit 110 and the display unit 150 are described as separate components in the exemplary embodiment, however, the input unit 110 and the display unit 150 may be embodied as one component such as a touch pad, a touch screen, or the like.

The printer driver unit 160 generates printing data for the printing work. Specifically, the printer driver unit 160, if the image forming apparatus 10 operates in a normal mode or a normal mode is selected in the user interface window to display information of the resource saving mode for the printing operation, can generate printing data by applying the printing options selected through the input unit 110 with respect to the selected printing work.

When the image forming apparatus 10 is operating in the resource saving mode, the printer driver unit 160 can generate printing data of the printing work by reflecting the property values of the respective printing options applied during the resource saving mode. The printer driver unit 160, if the user varies the property values of the printing options through the user interface window to display information of the resource saving mode, can generate printing data by reflecting the printing options applied during the resource saving mode and the property values selected by the user.

The controller 170 controls each unit of the printing control terminal device 100. Specifically, the controller 170 receives the printing order to request the printing operation for the printing work through the input unit 110, controls the communication interface unit 120 to receive information from the image forming apparatus 10 for the resource saving mode, controls the determination unit 140 to determine whether the image forming apparatus 10 is operating in the resource saving mode, and controls the display unit 150 to display to the user that the operation is being carried out in the resource saving mode if the image forming apparatus 10 is operating in the resource saving mode.

Further, the controller 170 can control the printer driver unit 160 to generate printing data with respect to the printing work selected by the user and control the communication interface unit 120 to transmit the generated printing data to the image forming apparatus 10.

When the image forming apparatus 10 is operating in the resource saving mode, the printer driver unit 160 is controlled to generate printing data reflected with the printing options applied during the resource saving mode. In addition, when the user changes property values of the printing options applied during the resource saving mode through the user interface window to display information of the resource saving mode, the printer driver unit 160 can be controlled to generate the printing data applied with the property values selected by the user and the printing options applied during the resource saving mode.

Accordingly, the printing control terminal device 100 according to an exemplary embodiment can show the user, through the user interface window to display information of the resource saving mode which is displayed during the printing operation, that the image forming apparatus is operating in the resource saving mode. Therefore, the user can easily identify the state of the image forming apparatus 10. In addition, the user can easily select through the user interface window whether the image forming apparatus 10 is to be operated in a normal mode or a resource saving mode or easily vary property values of printing options when the printing is operated in the resource saving mode.

Figure 2:
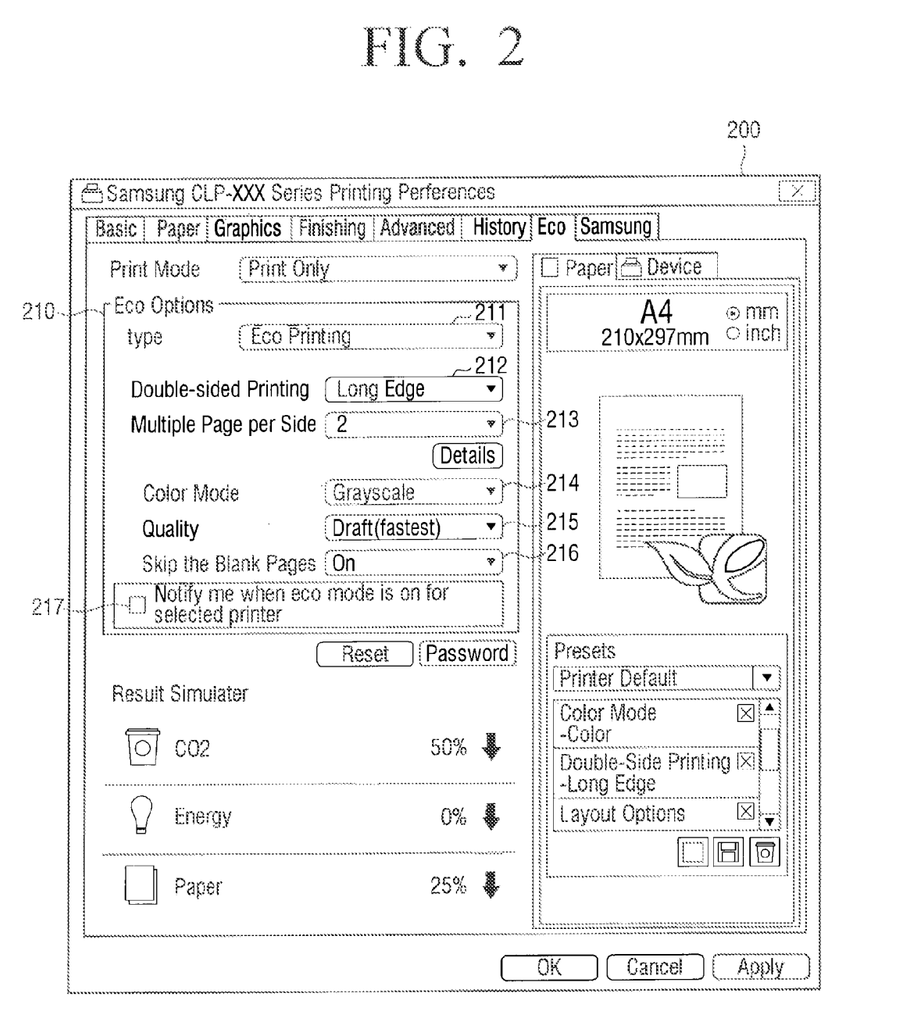
FIGS. 2 to 4 are various examples of a user interface window which can be displayed on the display unit of FIG. 1.

FIG. 2 illustrates an example of a user interface window to select printing options with respect to a printing work.

In reference to FIG. 2, the user interface window 200 is an example of a user interface window which can be displayed when the user selects the printer property window to change the printer property information. The user interface window 200 includes an eco options area 210 to set options related to the resource saving mode. The eco options area 210 includes areas 211-216 to display and set printing options to be applied in the resource saving mode. For example, area 211 displays printing options to set the resource saving mode, area 212 displays printing options related to double-sided printing, area 213 displays printing options related to a color mode, area 214 displays printing options related to a quality of printing, and area 216 displays printing options related to skipping blank pages. The eco options area 210 also includes a selection area 217 to display the status of and set the notification message option for whether or not to display the user interface window to display information of the resource saving mode.

The areas 211-216 display the printing options and corresponding property values which are applied when the image forming apparatus 10 is operated in the resource saving mode. Through these areas, the user can vary the property values of the printing options applied during the resource saving mode.

The selection area 217 receives an input of the user's selection of whether or not to display the user interface window to display information of the resource saving mode. If the user sets the option to display the user interface window to display information of the resource saving mode through the selection area 217, the user interface window to display information of the resource saving mode (e.g. a notification message in the form of a pop-up window) may be displayed to notify the user that the image forming apparatus 10 is being operated in the resource saving mode. The user interface window to display information of the resource saving mode may be displayed during a printing operation of a printing work when the image forming apparatus 10 is operating in the resource saving mode.

When the image forming apparatus 10 is operating in the resource saving mode, the options set in eco options area 210 will be applied when the print data is generated. When the image forming apparatus 10 is operating in the normal mode, the options set in the eco options area 210 are not necessarily applied, unless the user separately sets the options to be applied to a print work. For example, in the resource saving mode as set in FIG. 2, the color mode is set to grayscale. However, in the normal mode, if the user does not separately set the option for grayscale printing, the grayscale option is not applied. The options corresponding to the resource saving mode may be options that reduce the use of consumables. The printing options applied in the resource saving mode may include a double-sided output option, a multipage output option, a downsized printing option, a black and white output option, a toner saving/concentration adjusting option, a printing quality/resolution option, a batch output option, a blank page deleting option, a background deleting option, or a combination of the aforementioned printing options.

The printing options related to the resource saving mode may be accessed through a sub-menu tab of the user interface window 200, such as the 'Eco' tab illustrated in FIG. 2. When the 'Eco' tab is selected, the printing options related to the resource saving mode may be displayed. The user interface window 200 may include other sub-menu tabs to access selections of other printing options, such as a 'Basic' tab, a 'Paper' tab, a 'Graphics' tab, and a 'Finishing' tab.

Figure 3:
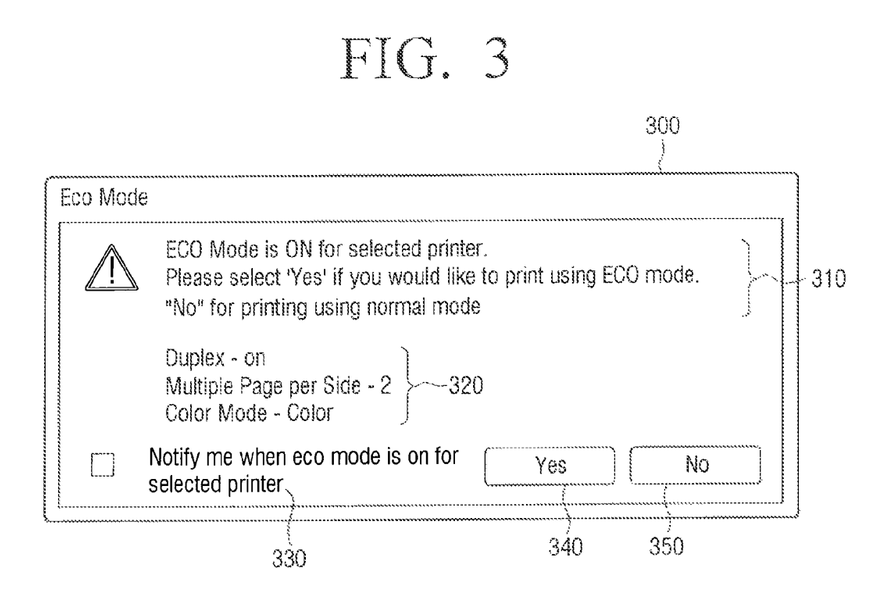
Figure 4:
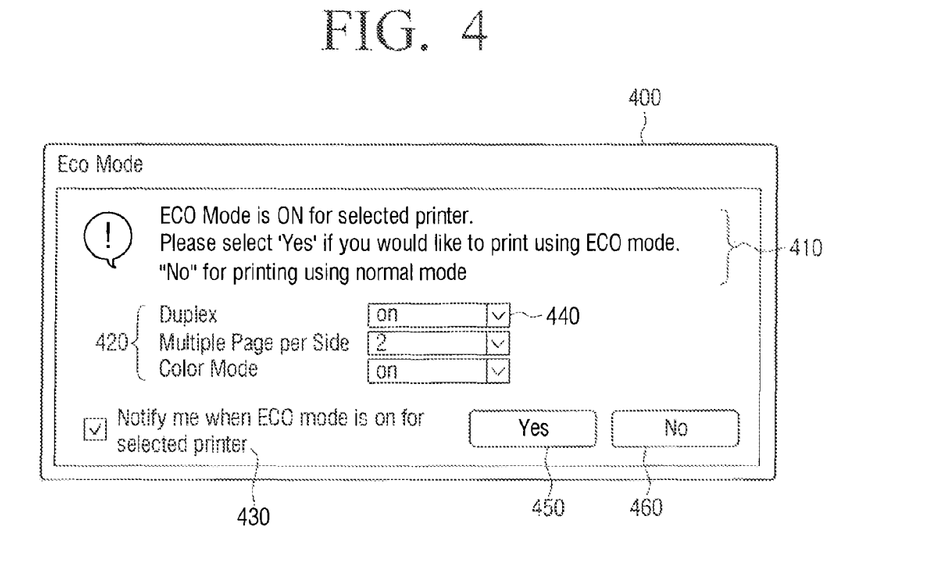

FIGS. 3 and 4 are examples of a user interface window to display information of the resource saving mode according to an exemplary embodiment. Specifically, the user interface windows depicted in FIGS. 3 and 4 are user interface windows to display information of the resource saving mode (e.g. notification messages) as described above.

Referring to FIG. 3, a user interface window 300 includes a first area 310, a second area 320, a third area 330, a "Yes" area 340, and a "No" area 350.

Specifically, the first area 310 displays whether the image forming apparatus 10 is operating in the resource saving mode based on the information of the resource saving mode received from the image forming apparatus 10.

In addition, the second area 320 displays information of printing options applied when the image forming apparatus 10 is operating in the resource saving mode. For instance, as depicted in FIG. 3, the printing options such as "double-sided printing", "multiple page per side", and "color printing" are applied during the resource saving mode.

Furthermore, the third area 330 is an area to display and set an option of whether to display the user interface window to display information of the resource saving mode for subsequent printing operations. That is, if the user sets the option to not display the user interface window to display information of the resource saving mode, in the next printing operation, the user interface mode to display information of the resource saving mode will not be displayed even if the image forming apparatus 10 is operating in the resource saving mode. The storage unit 130 stores the options set in the third area 330 such that it can be applied to a subsequent printing operation.

The "Yes" area 340 is an area to receive a confirmation from the user to perform the current printing work in the resource saving mode. If the user selects the "Yes" area 340, the printer driver unit 160 applies the printing options applied during the resource saving mode and generates the printing data for the printing work.

The "No" area 350 is an area to receive a confirmation from the user to perform the current printing work in the normal mode (i.e. not in the resource saving mode). If the user selects the "No" area 350, the printer driver unit 160 applies the printing options applied during the normal mode and generate the printing data for the printing work.

Through user interface window 300, the user can easily identify whether the image forming apparatus 10 is operating in the resource saving mode and identify the printing options applied during the resource saving mode.

Referring to FIG. 4, a user interface window 400 includes a first area 410, a second area 420, a third area 430, a fourth area 440, a "Yes" area 450, and a "No" area 460.

The first area 410, the second area 420, the third area 430, the "Yes" area 450, and the "No" area 460 function identically to the first area 310, the second area 320, the third area 330, the "Yes" area 340, and the "No" area 350 of FIG. 3, and thus the detailed descriptions thereof are omitted.

The fourth area 440 is an area to display and set the property values of respective printing options applied during the resource saving mode which are variable by the user. In the case that the user varies the property values of the printing options displayed in the fourth area 440, the printer driver unit 160 can generate the printing data by applying the property values of the printing options varied by the user for the printing operation performed while the image forming apparatus 10 is operating in the resource saving mode. The property values selected by the user can be applied only for the current printing work or can be applied for the subsequent printing works as well.

By the user interface window 400 described above, the user can easily identify whether the image forming apparatus 10 is operating in the resource saving mode and identify the printing options applied during the resource saving mode. In addition, the user can easily vary the property value of the printing options applied during the resource saving mode.

Figure 5:
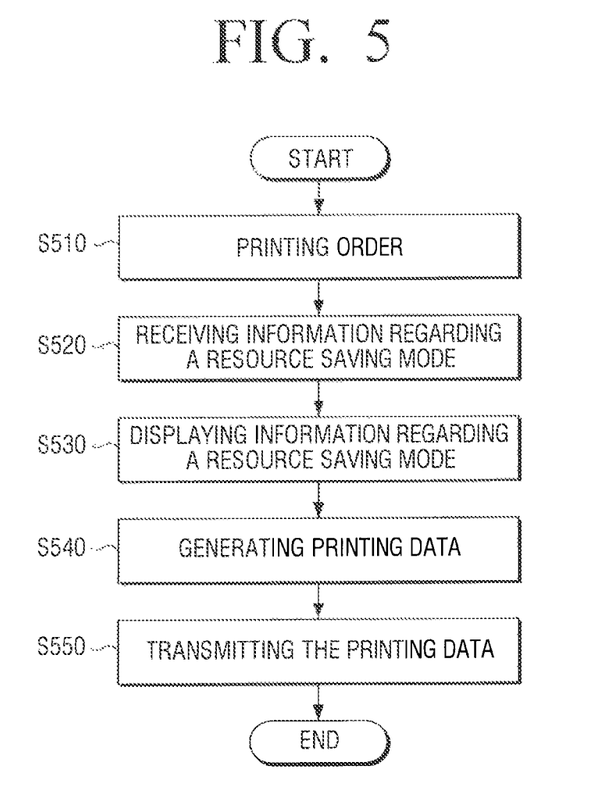
FIG. 5 is a flowchart for depicting an image forming method according to one exemplary embodiment of the present general inventive concept.

FIG. 5 is a flowchart for describing an image forming method according to one exemplary embodiment.

After a printing order to request a printing operation for a printing work is received in operation S510, information regarding the resource saving mode is received from the image forming apparatus 10 in operation S520.

The information regarding the resource saving mode can include information of whether the image forming apparatus 10 is operating in a resource saving mode, information of the printing options applied when the image forming apparatus 10 is operating in the resource saving mode, and property values (e.g. toner saving option, resolution option, etc.) applicable for the respective printing option. Additionally, the printing option applied during the resource saving mode can include a double-sided output option, a multipage output option, a downsized printing option, a black and white output option, a toner saving/concentration adjusting option, a printing quality/resolution option, a batch output option, a blank page deleting option, a background deleting option, or a combination of the aforementioned printing options.

The information of the received resource saving mode is displayed in operation S530, Specifically, a user interface window to display information of the resource saving mode is displayed. The user interface window may include the first area to display whether the image forming apparatus is operating in the resource saving mode, the second area to display information of the printing options applied during the resource saving mode, the third area to display property values variable by the user for the respective printing options, and the fourth area to receive a confirmation of whether or not to display the user interface window to display information regarding the resource saving mode during the operation of other printing works. The user interface window may be shown in the form of a pop-up window. The user interface window may also include a confirmation area to allow a user to confirm whether to proceed in the resource saving mode or whether to switch to the normal mode. While the user interface window is described as having four areas and a confirmation area, it is not limited thereto. The user interface window may have less or more areas. For example, the user interface Window may include only three of the areas described above. Additionally, according to an exemplary embodiment, the display operation may be activated only when the image forming apparatus 10 is operated in the resource saving mode.

The printing data for the printing work is generated in operation S540. Specifically, when the image forming apparatus 10 is operating in a normal mode, the printing data is generated according to the printing options selected by the user, and when the image forming apparatus is operating in the resource saving mode, the printing data is generated by reflecting the printing options applied during the resource saving mode. Meanwhile, if the user varies, through the user interface window, property values of printing options to be applied during the resource saving mode, the printing data can be generated by reflecting the property values as varied by the user.

Then, the generated printing data is transmitted to the image forming apparatus 10 in operation S550.

Accordingly, the printing control method according to an exemplary embodiment displays, after a printing order to request a printing operation for a printing work and during the printing operation, a user interface window indicating for the user through a pop-up window that the image forming apparatus is operating in the resource saving mode, and thus the user can easily identify the state of the image forming apparatus. In addition, the user can easily either select the printing condition of the image forming apparatus through the user interface window or vary the property value in case that the printing is executed in the resource saving mode. As shown in FIG. 5, the printing control method can be performed by the printing control terminal device 100 having the structure of FIG. 1 or by a printing control terminal device having another structure.

Figure 6:
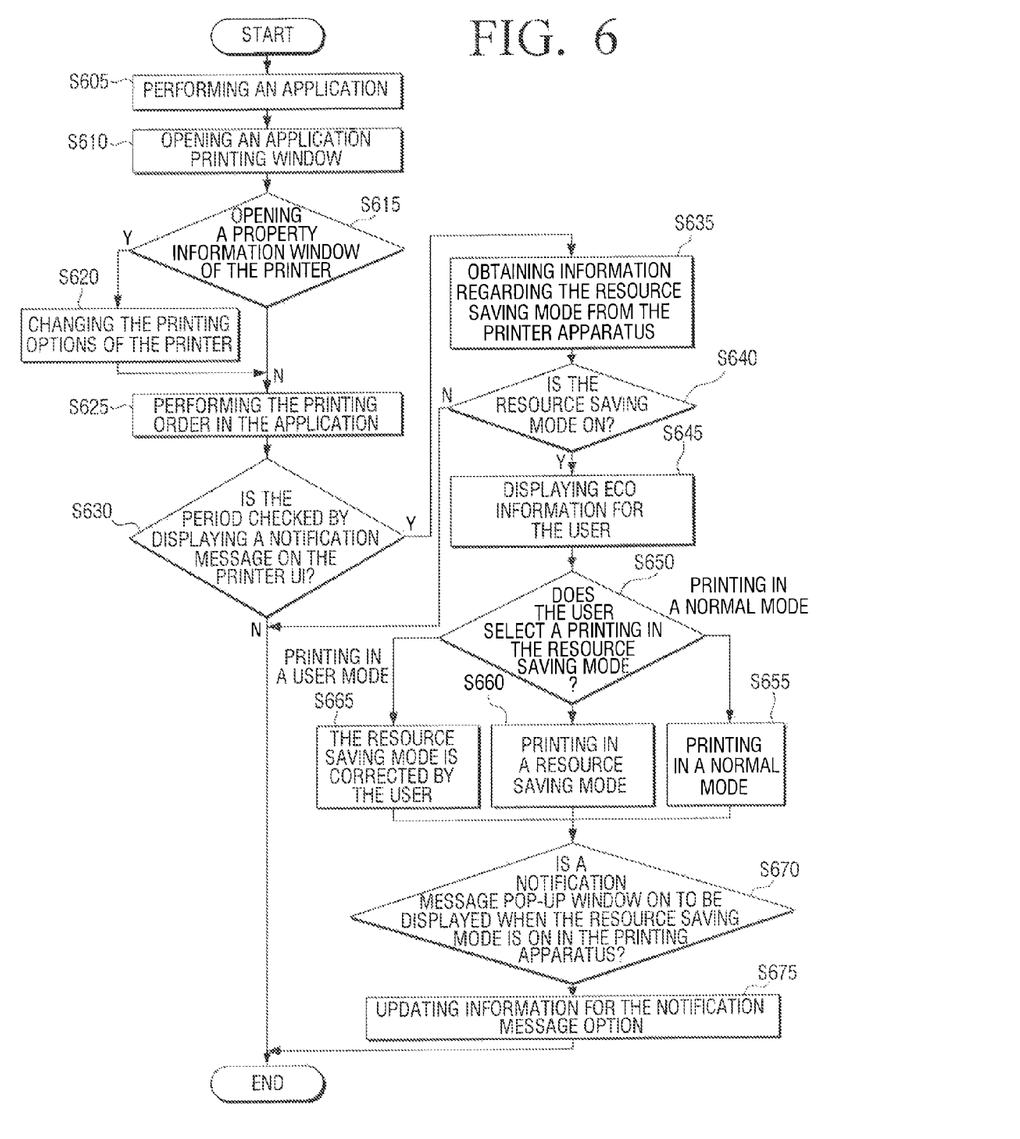
FIG. 6 is a flowchart for depicting an image forming method according to another exemplary embodiment of the present general inventive concept.

FIG. 6 is a flowchart for describing an image forming method according to another embodiment.

First, in order to edit or output a printing work, the user can execute an application in the printing control terminal device 100 in operation S605. When the user opens a printing window to set a printing option through the executed application in operation S610, a property window to set the printing options can be opened through the opened printing window in operation S615 and the printing options of a printer can be set through the opened property window in operation S620. After the user completes the setting of the printing options, the printing order for the printing work can be inputted in operation 3625.

If the user inputs a printing order, it can be determined whether a notification message will be displayed by using the user's pre-selected value (for example, the user's selection in the area 217 of FIG. 2, the area 330 of FIG. 3, the area 430 of FIG. 4) for whether or not to display the user interface window to display whether the image forming apparatus 10 is operating in the resource saving mode (e.g. notification message) in operation S630.

Meanwhile, if it is determined that the user pre-selected not to display the notification message, the printing data for the relevant printing work is generated in the conventional manner, and the generated printing data is transmitted to the image forming apparatus 10 to perform the printing work.

On the other hand, if it is determined that the user pre-selected to display the notification message, the information regarding the resource saving mode is obtained from the image forming apparatus in operation 3635.

Based on the information obtained regarding the resource saving mode, it is determined whether the image forming apparatus 10 is operating in the resource saving mode in operation 3640, and if it is determined that the image forming apparatus 10 is not operating in the resource saving mode, the printing data for the printing work is generated in the conventional manner, and the generated printing data is transmitted to the image forming apparatus 10 to be outputted accordingly.

If it is determined that the image forming apparatus is operating in the resource saving mode, the user is notified of the operation in the resource saving mode through a user interface window (e.g. notification message) in operation S645.

The user can select a printing method for the relevant printing work through the user interface window in operation S650. Specifically, if the user selects through the user interface window to output in a normal mode, a printing data can be generated to print out the relevant printing work in a normal mode in operation S655.

On the other hand, if the user selects through the user interface window to output in a resource saving mode, a printing data can be generated by reflecting printing options applied during the resource saying mode in operation S660. When the user changes, through the user interface window, the property values of the printing options applied during the output in the resource saving mode, the printing data can be generated by reflecting the printing options applied during the output in the resource saving mode and the property values selected by the user in operation S665.

If the user selects, through the user interface window, not to display the notification message during the next printing work in operation S670, the option information for the notification message is renewed in operation S675 not to display the notification message during the next printing work.

Accordingly, in the printing control method according to the exemplary embodiment, it can be easily identified through a displayed user interface window, for example a pop-up window, that the image forming apparatus is operating in the resource saving mode. Additionally, the user can easily select through the user interface window to print out in either a resource saving mode or a normal mode. In case of the printing in the resource saving mode, the property value relevant hereto can be easily varied, thereby improving the user's convenience. The printing control method described in FIG. 6 can be performed not only in the printing control terminal device 100 having the structure of FIG. 1 but also in a printing control terminal device having other structures.

Figure 7:
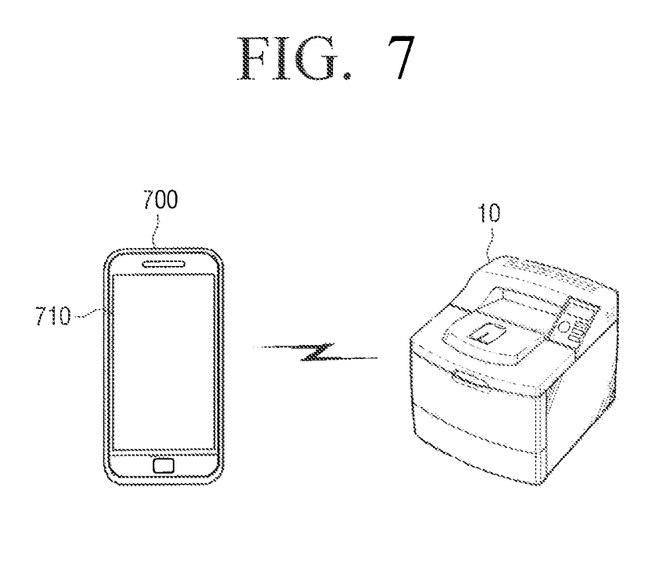
FIG. 7 illustrates a printing control terminal device according to an exemplary embodiment of the present general inventive concept.

FIG. 7 illustrates a printing control terminal device 700 according to an exemplary embodiment of the present general inventive concept.

The printing control terminal device 700 may include an input unit 110, a communication interface unit 120, a storage unit 130, a determination unit 140, a display unit 150, a printer driver unit 160, and a controller 170 similar to the printing control terminal device 100 illustrated in FIG. 1. The printing control terminal device 700 communicates with an image forming apparatus 10 via a wireless connection. The printing control terminal device 700 may include a touch screen 710 which may function as the input unit 110 and/or display unit 150. The printing control terminal device 700 may be a mobile device such as mobile phone, a personal digital assistant (PDA), a personal media player (PMP), a tablet computer, or the like.

The present general inventive concept can also be embodied as computer-readable codes on a computer-readable medium, The computer-readable medium can include a computer-readable recording medium and a computer-readable transmission medium, The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

The foregoing exemplary embodiments and advantages are merely exemplary and are not to be construed as limiting the present general inventive concept. The present teachings can be readily applied to other types of apparatuses. Also, the description of the exemplary embodiments of the present general inventive concept is intended to be illustrative, and not to limit the scope of the claims, and many alternatives, modifications, and variations will be apparent to those skilled in the art.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing control terminal device connectable to an image forming apparatus, the image forming apparatus having a resource saving mode which saves any one of an amount of paper and a toner used to print, the device comprising:
   a communication interface to receive information regarding the resource saving mode from the image forming apparatus;
   at least one processor to:
      determine whether or not the image forming apparatus is operating in the resource saving mode based on the received information regarding the resource saving mode when a printing order from a user of the printing control terminal device to request a printing operation from the image forming apparatus for a printing work is received,
      generate printing data for the printing work, and
      control the communication interface to transmit the generated printing data to the image forming apparatus; and
   a display to:
      display the received information regarding the resource saving mode when the image forming apparatus is determined as operating in the resource saving mode,
      display a user interface window to allow a user to set at least one property value of the resource saving mode before selecting the resource saving mode, and
      display at least one simulated result as at least one of a percentage of paper saved and a percentage of energy saved based on the at least one property value set by the user,
   wherein the at least one property value allowed to be set by the user includes at least one of a double-sided output option, a downsized printing option, a black and white output option, a toner saving/concentration adjusting option, a printing quality/resolution option, a batch output option, a blank page deleting option, and a background deleting option, and
   wherein at least two printing options are applied during the printing operation in the resource saving mode including at least a printing option related to a color mode and a printing option related to a quality of printing.

2. The device as claimed in claim 1, wherein the received information regarding the resource saving mode includes information of at least two printing options applied during the printing operation in the resource saving mode.

3. The device as claimed in claim 1,
   wherein if the processor determines that the image forming apparatus is operating in the resource saving mode, the processor generates printing data according to the at least two printing options applied when the image forming apparatus is operating in the resource saving mode.

4. The device as claimed in claim 1, wherein the display displays, in the form of a pop-up window, the user interface window including a first area to display whether the image forming apparatus is operating in the resource saving mode, and a second area to display information of the at least two printing options applied during the printing operation in the resource saving mode.

5. The device as claimed in claim 4, wherein the user interface window further comprises:
   a third area to display at least two property values corresponding to the at least two printing options applied during the printing operation in the resource saving mode and to allow the user to set the at least two property values.

6. The device as claimed in claim 5, wherein the processor generates the printing data according to the at least two printing options applied when the image forming apparatus is operating in the resource saving mode and the at least two property values set by the user through the third area.

7. The device as claimed in claim 4, wherein the user interface window further comprises:
   a fourth area to receive a confirmation of whether or not to display the user interface window during a printing operation for a subsequent printing work.

8. The device as claimed in claim 7, further comprising:
   a storage to store information of the confirmation of whether or not to display the user interface window that is received in the fourth area,
   wherein the display displays the received information regarding the resource saving mode according to the stored information of the confirmation of whether or not to display the user interface window.

9. A printing control method of a printing control terminal device connectable to an image forming apparatus having a resource saving mode which saves any one of an amount of paper and a toner used to print, the method comprising:
   by the printing control terminal device:
      receiving an input of a printing order from a user of the printing control terminal device to request a printing operation from the image forming apparatus for a printing work;
      receiving information regarding the resource saving mode from the image forming apparatus;
      determining whether or not the image forming apparatus is operating in the resource saving mode based on the received information of the resource saving mode;
      displaying a user interface window to allow a user to set at least one property value of the resource saving mode before selecting the resource saving mode,
      displaying at least one simulated result as at least one of a percentage of paper saved and a percentage of energy saved based on the at least one property value set by the user;
      displaying information regarding the received resource saving mode whenever the image forming apparatus is operating in the resource saving mode;
      generating printing data for the printing work according to a printing option selected by the user; and transmitting the generated printing data to the image forming apparatus, wherein the at least one at least one property value allowed to be set by the user includes at least one of a double-sided output option, a downsized printing option, a black and white output option, a toner saving/concentration adjusting option, a printing quality/resolution option, a batch output option, a blank page deleting option, and a background deleting option, and wherein at least two printing options are applied during the printing operation in the resource saving mode including at least a printing option related to a color mode and a printing option related to a quality of printing.

10. The method as claimed in claim 9, wherein the received information regarding the resource saving mode includes information of at least two printing options applied when the image forming apparatus is operating in the resource saving mode.

11. The method as claimed in claim 9, wherein if it is determined that the image forming apparatus is operating in the resource saving mode, the generating the printing data includes generating the printing data according to the at least two printing options applied when the image forming apparatus is operating in the resource saving mode.

12. The method as claimed in claim 9, wherein the displaying comprises:

displaying, in the form of a pop-up window, the user interface window including a first area to display whether the image forming apparatus is operating in the resource saving mode, and a second area to display information of the at least two printing options applied during a printing operation in the resource saving mode.

13. The method as claimed in claim 12, wherein the user interface window further includes a third area to display the at least two property values corresponding to the at least two printing options applied during the printing operation in the resource saving mode and to allow the user to set the at least two property values.

14. The method as claimed in claim 13, wherein the generating printing data comprises:

generating printing data according to the at least two printing options applied when the image forming apparatus is operating in the resource saving mode and the property values set by the user through the third area.

15. The method as claimed in claim 12, wherein the user interface window further includes a fourth area to receive a confirmation of whether or not to display the user interface window during a printing operation for a subsequent printing work.

16. The method as claimed in claim 15, wherein the displaying further comprises:

displaying the received information regarding the resource saving mode according to pre-stored information of whether or not to display the user interface window which is inputted by the user through the fourth area during a printing operation of a previous printing work.

17. A non-transitory computer-readable recording medium having embodied thereon a computer program to execute a method of a printing control terminal device connectable to an image forming apparatus having a resource saving mode which saves any one of an amount of paper and a toner used to print, wherein the method comprises:

by the printing control terminal device:

receiving an input of a printing order from a user of the printing control terminal device to request a printing operation from the image forming apparatus for a printing work;

receiving information regarding the resource saving mode from the image forming apparatus;

determining whether or not the image forming apparatus is operating in the resource saving mode based on the received information of the resource saving mode;

displaying a user interface window to allow a user to set at least one property value of the resource saving mode before selecting the resource saving mode, displaying at least one simulated result as at least one of a percentage of paper saved and a percentage of energy saved based on the at least one property value set by the user;

displaying information regarding the received resource saving mode whenever the image forming apparatus is operating in the resource saving mode;

generating printing data for the printing work; and transmitting the generated printing data to the image forming apparatus, wherein the at least one at least one property value set by the user includes at least one of a double-sided output option, a downsized printing option, a black and white output option, a toner saving/concentration adjusting option, a printing quality/resolution option, a batch output option, a blank page deleting option, and a background deleting option, and wherein at least two printing options are applied during the printing operation in the resource saving mode including at least a printing option related to a color mode and a printing option related to a quality of printing.

* * * * *

UNITED STATES PATENT AND TRADEMARK OFFICE
CERTIFICATE OF CORRECTION

PATENT NO. : 9,898,238 B2
APPLICATION NO. : 13/286764
DATED : February 20, 2018
INVENTOR(S) : Yong-in Eom et al.

Page 1 of 1

It is certified that error appears in the above-identified patent and that said Letters Patent is hereby corrected as shown below:

In the Claims

Column 17, Claim 9, Line 3, after "one" delete "at least one".

Column 17, Claim 11, Line 22, after "more," delete "the".

Column 18, Claim 17, Line 40, after "one" delete "at least one".

Signed and Sealed this
Tenth Day of July, 2018

Andrei Iancu
*Director of the United States Patent and Trademark Office*